United States Patent [19]

Lerner et al.

[11] 4,133,354
[45] Jan. 9, 1979

[54] COFFEE BREWER WITH MEANS FOR DISPENSING CONTROLLED QUANTITIES OF HOT WATER

[76] Inventors: Edward Lerner, 3 Marshall St., Irvington, N.J. 07111; John A. Ventura, 32 Jefferson St., Nutley, N.J. 07110

[21] Appl. No.: 772,855

[22] Filed: Feb. 28, 1977

Related U.S. Application Data

[63] Continuation-in-part of Ser. No. 532,366, Dec. 13, 1974.

[51] Int. Cl.² .............................................. B65B 3/04
[52] U.S. Cl. ............................... 141/18; 141/DIG. 1; 99/300; 222/146 HE
[58] Field of Search ................. 99/281, 282, 283, 288, 99/305, 306, 307, 300; 137/341; 222/146 HE, 146 R, 146 H, 67; 141/192, 95, 346–362, 382–386, 18, DIG. 1

[56] References Cited

U.S. PATENT DOCUMENTS

| | | | |
|---|---|---|---|
| 3,143,636 | 8/1964 | Lupouici | 222/146 HE |
| 3,220,334 | 11/1965 | Martin | 222/146 HE |
| 3,835,295 | 9/1974 | Ronchese | 219/314 |

Primary Examiner—Houston S. Bell, Jr.
Attorney, Agent, or Firm—Carella, Bain, Gilfillan & Rhodes

[57] ABSTRACT

A coffee brewer with means for dispensing controlled quantities of hot water comprising well known coffee brewing means including a main water tank having a heater therein, means for introducing water to the tank and a discharge conduit for passing coffee brewing water from the tank wherein there is provided a separate and preferably removable, closed water bottle mounted for gravity feed of water to the tank, a discharge conduit connecting the bottle to the tank, the normal operational position of the end of which proximal to the tank being located such that water normally covers it before water in the tank reaches a level sufficient to pass through the conduit for discharging brewing water, a separate, valve controlled single-cup water discharge spigot connected to the tank beneath the level in the tank of the end of the conduit connecting the bottle with the tank, a valve normally blocking the gravitational discharge of water from the bottle and valve actuating means which open the valve when the bottle is mounted in its normal operational position for gravity feed of water to the tank.

11 Claims, 5 Drawing Figures

COFFEE BREWER WITH MEANS FOR DISPENSING CONTROLLED QUANTITIES OF HOT WATER

CROSS REFERENCE TO RELATED APPLICATION

This application is a continuation-in-part of patent application Ser. No. 532,366, filed Dec. 13, 1974.

BACKGROUND OF THE INVENTION

A wide variety of coffee brewing devices are well known in the art. One such device comprises a housing for a water tank, the tank having an inlet in the top thereof connected to a receiving tray. The tank is also provided with a siphon extending generally from the top thereof outwardly terminating in a spray head located above a funnel having coffee grounds supported therein on a filter paper. Another well known form of coffee brewing device substitutes a water overflow tube for the siphon, the tube being connected to the aforesaid spray head.

In operation, water is added to the tank up to the level of the discharge conduit whether it be a siphon or an overflow tube and the heater energized until the water in the tank reaches the desired coffee brewing temperature. The coffee brewer is now in condition to be employed to brew coffee. In order to brew coffee, cold make-up water is poured into the receiving tray from whence it passes gravitationally downwardly through an antidiffusion tube to the bottom of the tank thereby forcing the preheated water therein upwardly by displacement with little mixing of hot and cold water. As the level of the preheated water rises in the tank, it passes into the siphon or overflow tube and from thence to a spray head over a funnel containing ground coffee supported on a filter.

The volume of water discharged through the spray head is equal to the volume of cold make-up water added to the tank provided that the water level in the tank initially is immediately beneath the entrance to the siphon or overflow tube.

Such coffee brewers are generally adapted only for the discharge of relatively large quantities of water sufficient to make a full pot of fresh coffee. They are not adapted for the discharge of smaller, controlled quantities of hot water for use as make-up for tea, soups, hot chocolate or other beverages or liquid foods.

Moreover, if the heated water in the tank remains unused for more than a few hours, evaporation lowers the water level in the tank. Consequently, the volume of hot water discharged through the spray head is less than the volume of cold make-up water added which adversely affects the quality of the coffee brewed. The level of the water in the tank is not visible from outside of the tank. Therefore, one can never be certain as to whether or not a sufficient quantity of cold make-up water has been added to achieve the desired amount of coffee. Additionally, if an excessive quantity of cold make-up water is required to compensate for evaporation, the mean temperature of the water discharged for brewing may be lower than that desired.

Therefore, there is great need in the art for a coffee brewer which provides means for dispensing relatively small, limited but controlled quantities of hot water without adversely affecting the volume of hot water immediately available for brewing purposes as well as means for continuously replacing water lost through evaporation.

It is among the objects and advantages of the present invention to provide such a coffee brewer which includes a separate and preferably removable water supply reservoir adapted for dispensing lesser but controlled quantities of hot water from a separate, valve controlled discharge conduit.

Still another object of the present invention is to provide a coffee brewer with means for dispensing controlled quantities of hot water less than the volume necessary for brewing a full pot of coffee in which make-up water from a separate reservoir is automatically supplied in the precise quantity withdrawn without resort to mechanical valves between the said reservoir and the water heating tank from which the hot water is withdrawn.

Yet another object of the present invention is to provide the reservoir aforesaid with closure means to prevent unwanted or inadvertent gravitational discharge of water until it is placed a normal operating position in association with a coffee brewer and including opening means for automatically opening the reservoir means when the reservoir is placed in its normal operating position.

SUMMARY OF THE INVENTION

A coffee brewer with means for dispensing controlled quantities of hot water comprising a first water tank; water inlet means connected to the first water tank; a water discharge conduit connected to the first tank, the discharge of water therethrough being responsive to the water level in the first tank; a second water tank positioned for gravity feed of water therefrom to the said first tank; conduit means connecting the first and second tanks, the normal operational position of the discharge end of said conduit means opposite the second tank being located such that water normally covers said end before water reaches a level in the first tank sufficient for continuous flow through the said water discharge conduit, the said second tank being closed except for the said conduit means when in the normal operating position for discharge into the first tank; valve-controlled water discharge conduit means connected to the first tank having an entrance in the first tank at a level with respect to the normal operational level of water therein beneath the level of the said discharge end of the conduit means connecting the first and second tanks; valve means normally blocking the gravitational discharge of water from the second tank; and valve opening means which open the said valve means when the second tank is located in the normal operational position for gravity feed of water to the first tank.

PREFERRED EMBODIMENT OF INVENTION

The objects and advantages of aforesaid as well as other objects and advantages may be achieved by the coffee brewer with means for dispensing controlled but limited quantities of hot water illustrated in the drawings in which.

Figure 1:
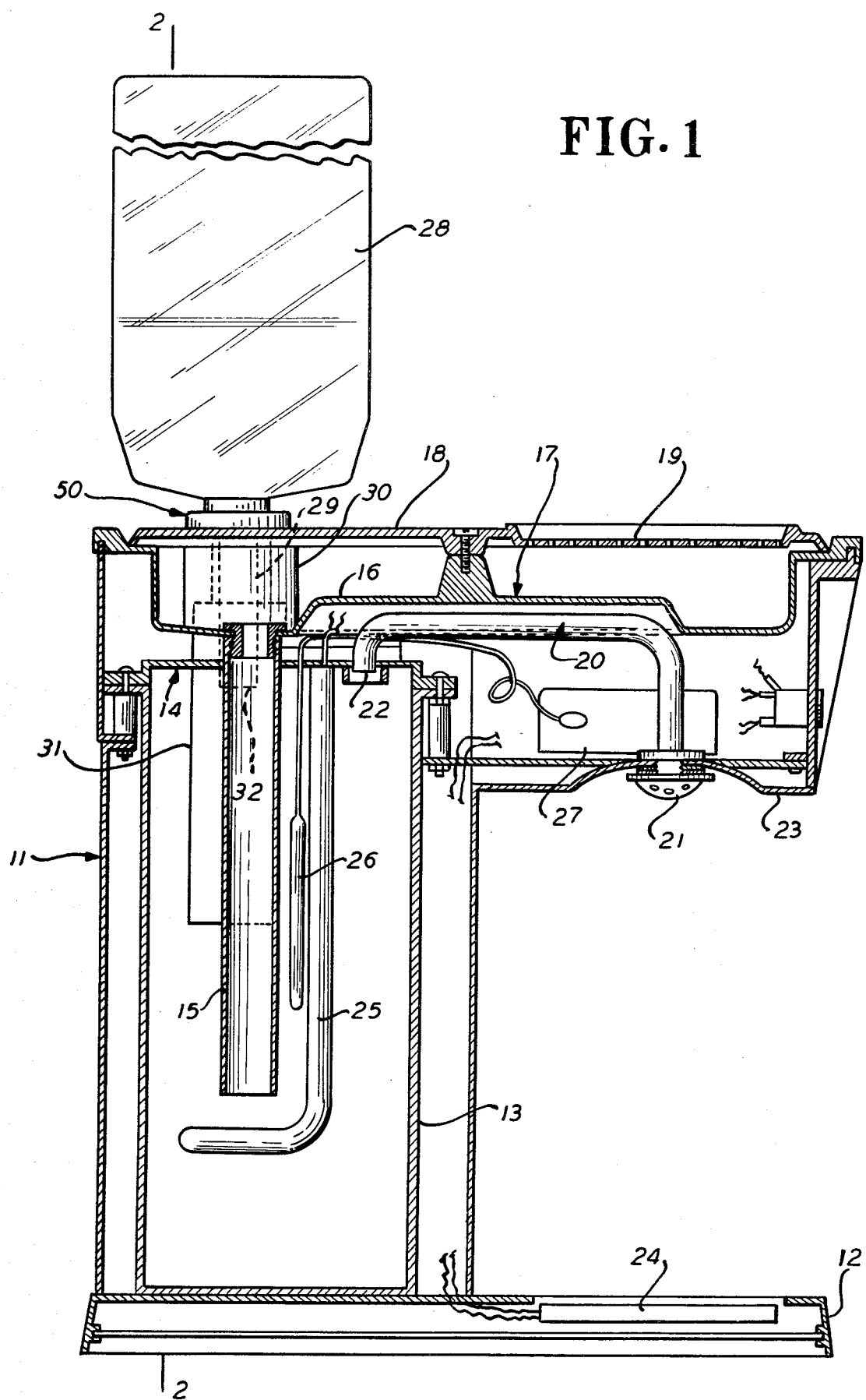
FIG. 1 is a side elevational cross-sectional view of an embodiment of the coffee brewer.

Referring now to the drawings in detail, the coffee brewer comprises a common, well-known coffee brewing device having a housing 11 mounted on a pedestal 12. A water tank 13 is mounted within the housing 11 on the pedestal 12. The water tank 13 is provided with a top cover 14 through which a water inlet conduit 15 extends depending downwardly toward the bottom of the tank 13, the conduit 15 functioning as an anti-diffusion means. The water inlet conduit 15 extends upwardly through the top 14 of the tank 13 communicating with the bottom 16 of a water receiving tray 17 which is positioned above the water tank 13. The tray 17 is provided with a cover 18 which functions as a cover for the housing 11. The cover 18 is provided with an opening 19, preferably an open grill, for the introduction of water into the tray 17 and from thence downwardly through conduit 15 into the water tank 13.

A siphon 20 is connected to the tank 13 through its top 14. A spray head 21 functioning as a discharge end to the siphon 20 is positioned at a level beneath the inlet end 22 thereof. The spray head 21 of the siphon 20 depends beneath a horizontally extending arm 23 on the housing 11 and above a portion of the pedestal 12 containing an electrically energized heating plate 24.

The water tank 13 is also provided with electrical heating means preferably a calrod heater 25. Additionally a heat sensing probe 26 is positioned within water tank 13 and is electrically connected to either a preset or manually set control 27 which energizes and de-energizes the heater 25 to maintain a desired temperature.

The above-described coffee brewing apparatus is well-known. In operation, water introduced through opening 19 flows into tray 17 and from thence through conduit 15 into the bottom most portion of water tank 13. The level of water in tank 13 rises until the crest of the siphon 20 is reached whereupon a siphoning action ensues with water passing through siphon 20 and spray head 21 to a column of ground coffee in a funnel supported on a filter. Coffee is brewed by passing through the coffee grounds. Because of the siphoning action, the quantity of water discharged from the tank 13 will be equal to the quantity of water introduced into the tray assuming of course that the water level in tank 13 is initially immediately beneath inlet end 22 of siphon 20. When the level of water falls below the inlet end 22 of the siphon 20, the siphoning action is broken and the flow of water ceases.

Because fresh water introduced into the tray 17 is discharged through conduit 15 near the bottom of the tank 13, the hot water in tank 13 will be displaced upwardly with little mixing so that water discharged through siphon 20 will be generally at a temperature substantially equal to the ambient temperature of the water in the tank 13. The tank 13 is dimensioned with respect to the usual quantity of water necessary to brew a pot of coffee such that the mean temperature of water discharged therefrom is proper for brewing.

Although the siphon system has been shown and described, the alternate overflow tube system is also well-known in the art and may be employed to practice the within claimed invention. Such an overflow tube functions substantially the same as the siphon.

In order to provide means for the discharge of controlled but limited quantities of hot water without resort to the siphon 20 (or overflow tube), a separate, closed water reservoir 28 in the form of a removable bottle is mounted on the cover 18 over the tray 17. A discharge conduit 29 depends from the bottom of the reservoir 28 downwardly through the top 14 of the water tank 13. A pair of telescopic conduits 30 and 31 which extend through the top 14 of the water tank 13 and the bottom 16 of the tray 17 are employed to discharge the water from the reservoir 28 at the bottom most portion of the tank 13. A small opening in the top of conduit 30 at the neck 32 of the reservoir 28 provides for air relief from conduits 30 and 31.

The bottom or discharge end of conduit 29 connected to the reservoir 28 is positioned at a level beneath that of the end 22 of the siphon 20. In the case of an overflow tube, the said discharge end of conduit 29 is positioned at a level beneath the top most end of the overflow tube.

A hot water discharge conduit 33 is connected to the side 34 of the tank 13 extending outwardly through the housing 11 to a manually operated spigot or valve 35. The valve 35 is manually operated by lever 36 for the withdrawal of desired quantities of hot water.

Figure 2:
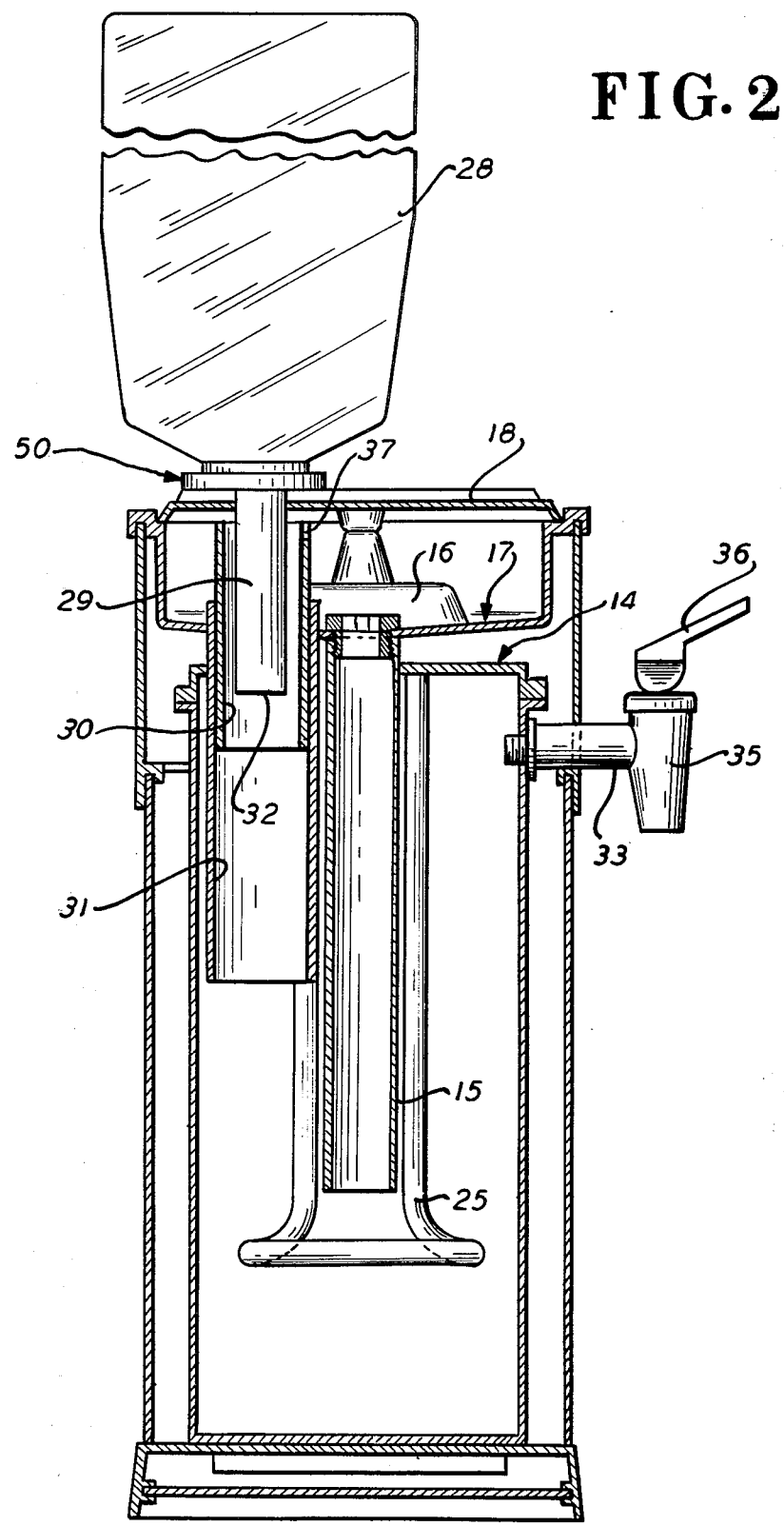
FIG. 2 is an end elevational cross-sectional view of the coffee brewer shown in FIG. 1 taken along lines 2—2 therein.

In operation, the reservoir 28 is filled with water and positioned as illustrated in FIGS. 1 and 2 with the discharge conduit 29 extending downwardly into the tank 13. This is the normal operational position of the reservoir 28 and its associated elements including conduit 29. When the level of the water in tank 13 covers the bottom end of the discharge conduit 29, the flow of water from the reservoir terminates because of an air lock, the reservoir 28 being closed. Because the level of the bottom end of conduit 29 is beneath the level of the inlet end 22 of the siphon 20, under normal operating conditions no water passes from reservoir 28 to tank 13 through the siphon 20 to spray head 22. The same may be said of an overflow tube system. However, when valve 35 is open to withdraw water from the tank 13, the level therein drops beneath the bottom of discharge conduit 29 connected to reservoir 28 resulting in a flow of water from reservoir 28 equal in volume to the volume of water withdrawn through conduit 33. When valve 35 is closed, water will cease passing from reservoir 28 into tank 13 when the level of the water in tank 13 rises sufficiently to cover the bottom end of discharge conduit 29.

Preferably the conduit 33 is positioned at a level generally proximal to the top of the tank 13 so as to insure the withdrawal of hot water. Cold water from the reservoir 28 first passes downwardly into the bottom most portion of water tank 13 through conduit 31 displacing hot water upwardly thus insuring that the cold water will not tend to pass outwardly through conduit 33. The bottom of conduit 31 should be sufficiently far beneath the level of conduit 33 to insure that the mean temperature of water withdrawn through conduit 33 is near the ambient temperature of the water in tank 13.

Figure 3:
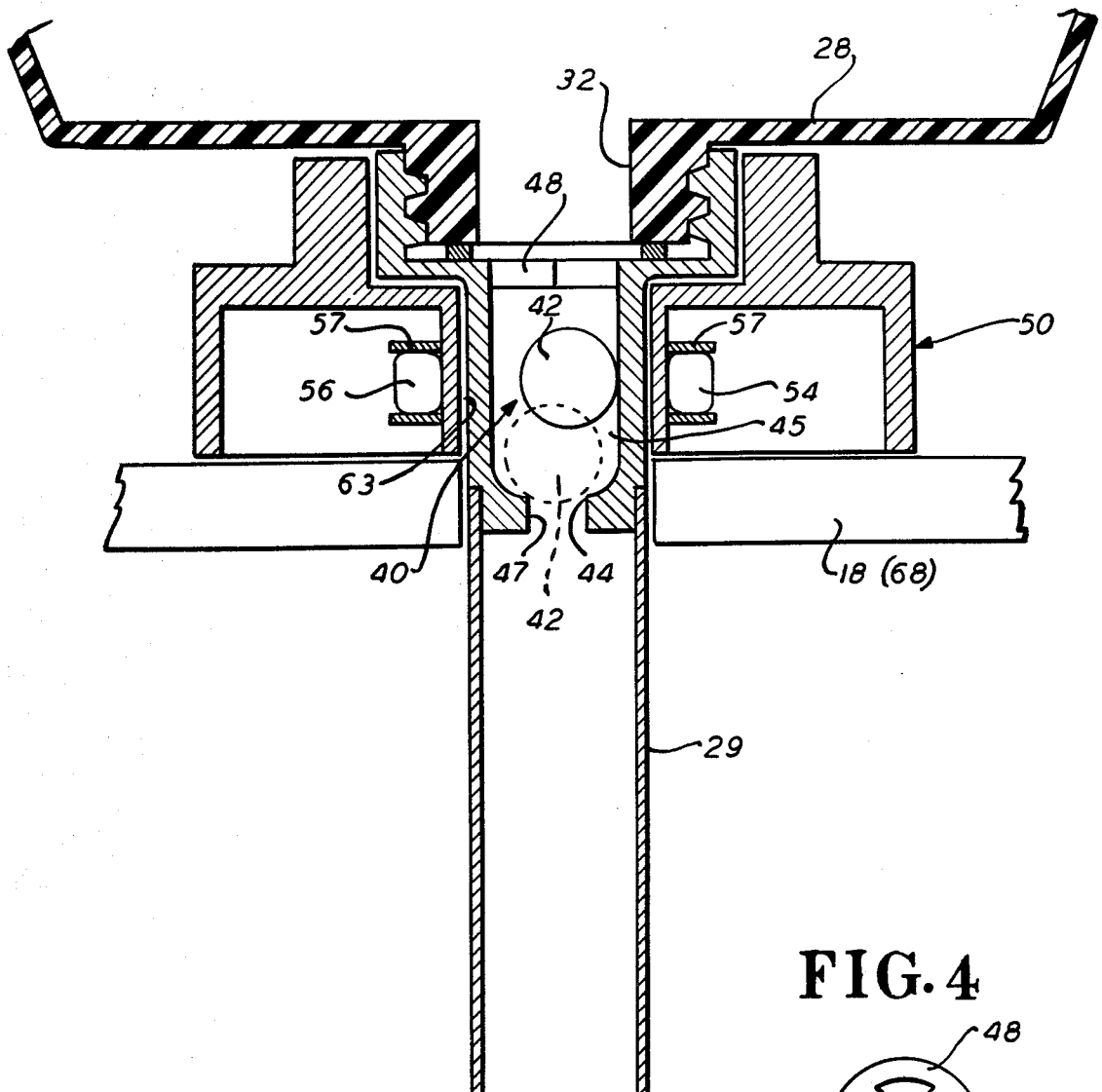
FIG. 3 is a side elevational cross-sectional view illustrating details of the closure means and opening means associated with the separate water reservoir.
Figure 4:
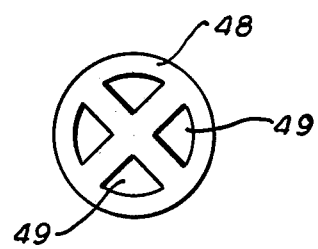
FIG. 4 is a top view of a grate shown in FIG. 3.
Figure 5:
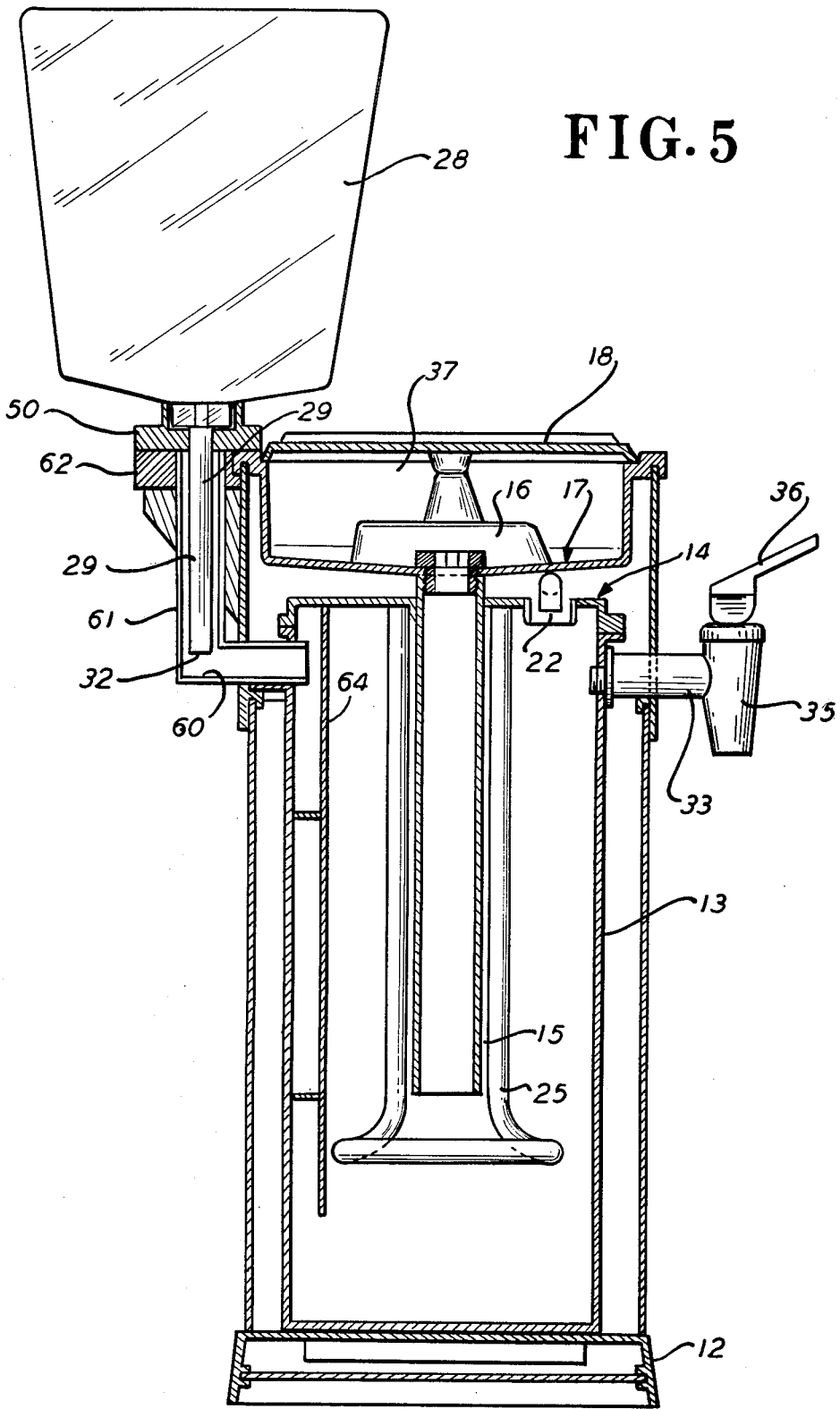
FIG. 5 is a side elevational cross-sectional view similar to FIG. 2 of an alternate embodiment of the present invention.

Referring now in particular to FIGS. 3, 4 and 5, the discharge conduit 29 may be removably connected and disconnected to the neck or water discharge end 32 of the water reservoir 28 and the discharge conduit 29 may be further provided with closure means indicated by general numerical designation 44 normally blocking the gravitational discharge of water from the water reservoir 28 through the discharge end 32 thereof before and until the water reservoir 28 is placed in its normal operational position above the water tank 13.

As will be understood by those skilled in the coffee brewer arts, the water reservoir 28 is typically filled from a water bottle or tap water while the water reservoir 28 is removed from the coffee brewer and is inverted into a position opposite that shown in the drawings. For filling, the discharge conduit 29 is threadably disengaged from the water reservoir 28 and the water reservoir is filled with water. Then, the discharge conduit 29 is threadably reconnected to the water reservoir 28 and the closure means 40 prevents unwanted discharge of water from the water reservoir 28 as it is being inverted into the position shown in the drawings and placed into its normal operational position over water tank 13.

More particularly, the closure means 40 may be comprised of a solid spheroid or ball 42 of magnetic material which, upon the water reservoir 28 being inverted, under the influence of gravity, engages an inwardly extending annular rib 44 provided internally of the discharge conduit 29. The discharge conduit 29 is provided with a chamber 45 for receiving the spheroid 42 and the chamber is formed by a generally cylindrical side wall which translates into a converging curved portion at the bottom thereof which terminates in the annular rib 44 and provides a water outlet 47 smaller in diameter than the spheroid 42. Upon the spheroid of magnetic material 42 engaging the inwardly extending annular rib 44, the outlet 47 is blocked and thus the water discharge end 32 of the water reservoir 28 is blocked and discharge of water from the water reservoir is prevented.

The top of the chamber 45 is provided with a generally circular grate 48 best illustrated in FIG. 4, for retaining the spheroid 42 in the chamber 45 upon the water reservoir 28 and the discharge conduit 29 being inverted. The grate 48 is provided with openings 49 for allowing water from the reservoir 28 to flow into the water tank 13 upon the spheroid being moved out of engagement with the annular rib 44 in accordance with the present invention and as taught below. The openings 49 are sufficiently small to prevent the spheroid 42 from passing therethrough. The grate 48 may be suitably secured in position to the discharge conduit 29 such as by a suitable adhesive or by mechanical press fit. The discharge conduit 29 and the grate 48 may be made of any suitable plastic and preferably of nonmagnetic material. The discharge conduit 29 may also be made integrally or in two pieces as illustrated which are suitably secured together such as by a suitably plastic adhesive or bonding material. Since, of course, water must be discharged from the water reservoir 28 in accordance with the foregoing teachings of the present invention, the coffee brewer is provided with opening means identified by general numeral designation 50 best shown in FIG. 3 for opening the closure means 40 as the water reservoir 28 is placed in its normal operational position above the water tank 13 thereby permitting discharge of water from the water reservoir 28 into the water tank 13.

More specifically, the opening means 50 may be comprised of magnetic means for magnetically attracting the spheroid of magnetic material 42 out of its blocking position, i.e. for attracting the spheroid 42 upwardly to the side as shown in FIG. 3 in solid lines and thus away from or out of blocking engagement with the inwardly extending annular rib 44 as shown in FIG. 3 in broken lines. As the closure means 40 moves downwardly past the stationary opening means 50 as the reservoir 28 is being placed in its normal operational position above water tank 13, the spheroid 42 moves out of blocking position and thereby permits the flow of water from reservoir 28 to tank 13.

The magnetic opening means 50 may be comprised of an annular array of magnets 54 and 56 as illustrated in FIG. 3 which magnets may be suitably imbedded or secured mechanically in an annular supporting ring 57. As illustrated in FIGS. 1 and 2, the magnetic opening means 50 may be suitably positioned on a fitting lying over the cover 18 of the coffee brewer. In such position, the opening means surround the opening through which the discharge conduit 29 extends to connect the water reservoir 28 with the tank 13 as taught above.

In summary, it will be understood that the closure means 40 and opening means 50 of the present invention present unwanted discharge of water from the water reservoir 28 and provide for the automatic opening of the closure means 40 as the water reservoir 28 is being inverted and being placed into its normal operational position above water tank 13. Thus, unintended discharge of water from the water reservoir 28 is prevented and the coffee brewer according to the present invention is permitted to act in accordance with the present invention as taught above.

Referring now to FIG. 5, there is shown an alternate embodiment of the present invention which is particularly useful in the practice of the invention in the modification of an existing coffee brewer.

As is known to those skilled in the coffee brewer arts, installed coffee brewers typically have much equipment mounted at the top thereof and also typically have considerable auxiliary and peripheral equipment mounted on the top of the tank 13. Accordingly, positioning the water reservoir 28 above the tank 13 can be undesirably difficult including the cutting of various intermediate structures. Hence the alternate embodiment of the present invention illustrated in FIG. 5 can be preferable.

In the invention embodiment shown in FIG. 5, the water reservoir 28 is supported laterally of the water tank 13 with the discharge end 32 of discharge conduit 29 depending from the reservoir 28 being located laterally at a level beneath the level of the inlet end 22 of siphon 20 in water tank 13, and in the case of an overflow system, beneath the level of the top most opening in the overflow tube.

A conduit 60 in lieu of the telescopic conduits 30 and 31 of FIG. 2 extends laterally of the water tank 13 adjacent to the top thereof and interconnects the water reservoir 28 with the water tank 13 for the gravity discharge of water from the reservoir 28 into the tank 13 through an interconnecting vertical conduit 61 which receives discharge conduit 29. A baffle 64 is positioned in the tank 13 by being suitably secured as shown to the wall of the tank 13 and the baffle 64 extends downwardly a predetermined distance as illustrated so as to deflect water received in the water tank 13 from the reservoir 28 downwardly and deeply into the tank 13, the baffle 64 functioning therefore as an anti-diffusion means.

It will be further understood that the vertical conduit 61 passes through and is supported by a mounting block 62 attached to the housing 11. The block 62 suitably supports the closure means 50 shown in detail in FIG. 3 and in turn, reservoir 28. It will be further understood that the discharge conduit 29 of the water reservoir 28 is provided with the closure means 40 shown in detail in FIG. 3.

In the embodiment illustrated in FIGS. 1 and 2, an air relief passage 37 is provided at the top of conduit 30. In the embodiment illustrated in FIG. 5, air relief is provided intermediate the top of block 62 and the closure means 50 by virtue of less than air-tight interengagement. Moreover, air relief is provided through the passage 63 in the closure means 50 through which conduit 29 depends.

It will be further understood by those skilled in the art that many variations and modifications may be made in the present invention without departing from the spirit thereof.

What is claimed is:

1. A coffee brewer with means for dispensing controlled quantities of hot water, comprising:
   (a) a first water tank;
   (b) water inlet means connected to the first water tank;
   (c) a water discharge conduit connected to the first tank; the discharge of water therethrough being responsive to the water level in the first tank;
   (d) a second water tank positioned for gravity feed of water therefrom to the said first tank;
   (e) conduit means connecting the first and second tanks, the normal operational position of the discharge end of the said conduit means opposite the second tank being located slightly above the top end of the said water discharge conduit such that water normally covers said discharge end before water reaches a level in the first tank sufficient for continuous flow through the top end of said water discharge conduit;
   (f) the said second tank being closed except for the said conduit means when in the normal operating position for discharge into the first tank; and
   (g) valve-controlled water discharge conduit means connected to the first tank having an entrance in the first tank at a level with respect to the normal operational level of the water therein beneath the level of the said discharge end of the conduit means connecting the first and second tanks.

2. A coffee brewer according to claim 1 comprising:
   (a) valve means normally blocking the gravitational discharge of water from the second tank, and
   (b) valve opening means which open the said valve means when the second tank is located in the normal operational position for gravity feed of water to the first tank.

3. A coffee brewer according to claim 2 wherein
   (a) the closure means is a ball valve in which the ball is magnetically influencable, and (b) the opening means is a magnetically influencing body which moves the ball sufficiently to open the conduit means when the second tank is in the normal operational position for discharge of water into the first tank.

4. A coffee brewer according to claim 3 wherein
   (a) the ball is fabricated of a ferro-magnetic material, and
   (b) the magnetically influencing means is a magnet.

5. A coffee brewer according to claim 1 and
   (a) means to support the second water tank for gravity discharge of water to the first said water tank,
   (b) the opening means being carried by the support means.

6. A coffee brewer according to claim 5 and
   (a) the support means having an opening to receive the said conduit means and the closure means when in said second tank is in the normal operational position for discharge of water into the first tank.

7. A coffee brewer according to claim 1 and
   (a) a generally laterally extending conduit communicating with the said first tank;
   (b) a generally vertically extending conduit communicating with the laterally extending conduit,
   (c) the said conduit means depending downwardly through the vertically extending conduit,
   (d) the said second tank being located above the vertically extending conduit.

8. A coffee brewer according to claim 7 and
   (a) a housing for the first tank, the housing having a top,
   (b) the closure means being positioned at the top of the vertically extending conduit.
   (c) the second tank being positioned on top of the closure means, at least a portion of said second tank extending above the top of the housing.

9. A coffee brewer according to claim 8 and
   (a) air escape means communicating with the generally vertically extending conduit above the highest level of water in the discharge conduit during discharge of water therethrough.

10. A coffee brewer according to claim 8 in which
    (a) the normal operational position of the second tank is wholly above the top of the housing.

11. A coffee brewer according to claim 2 wherein the said valve means and valve opening means comprises:
    (a) a magnetically influencable member normally closing said conduit means against the gravitational discharge of water from the second tank, and
    (b) magnetically influencing means which influence said member to move sufficiently to open said conduit means for the gravitational discharge of water when the second tank is in the normal operational position for discharge into the first tank.

* * * * *

UNITED STATES PATENT OFFICE
CERTIFICATE OF CORRECTION

Patent No. 4,133,354   Dated January 9, 1979

Inventor(s) Edward Lerner and John A. Ventura

It is certified that error appears in the above-identified patent and that said Letters Patent are hereby corrected as shown below:

Column 6, line 19, "present" should be --prevent--

In the claims,

Column 7, line 30, "above" should be --below--

Signed and Sealed this

Eighth Day of May 1979

[SEAL]

Attest:

RUTH C. MASON
Attesting Officer

DONALD W. BANNER
Commissioner of Patents and Trademarks